April 14, 1942.    E. L. BARRETT    2,280,023
VIBRATOR
Filed July 1, 1939
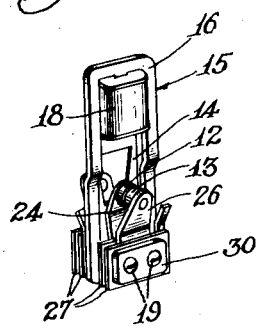
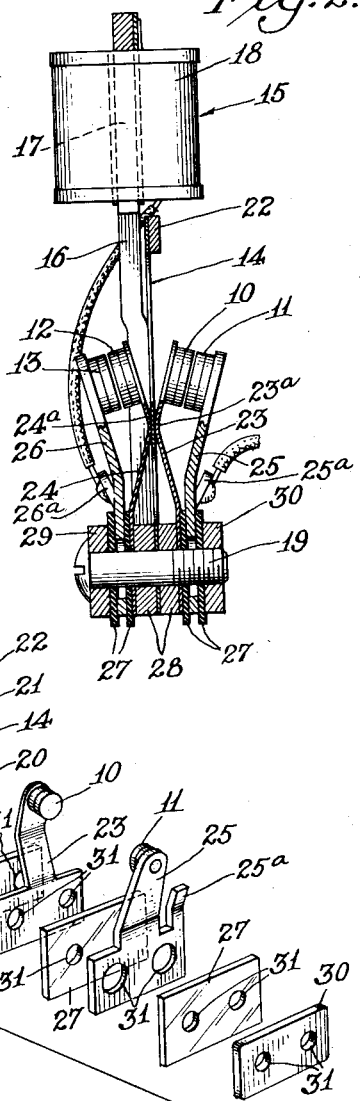
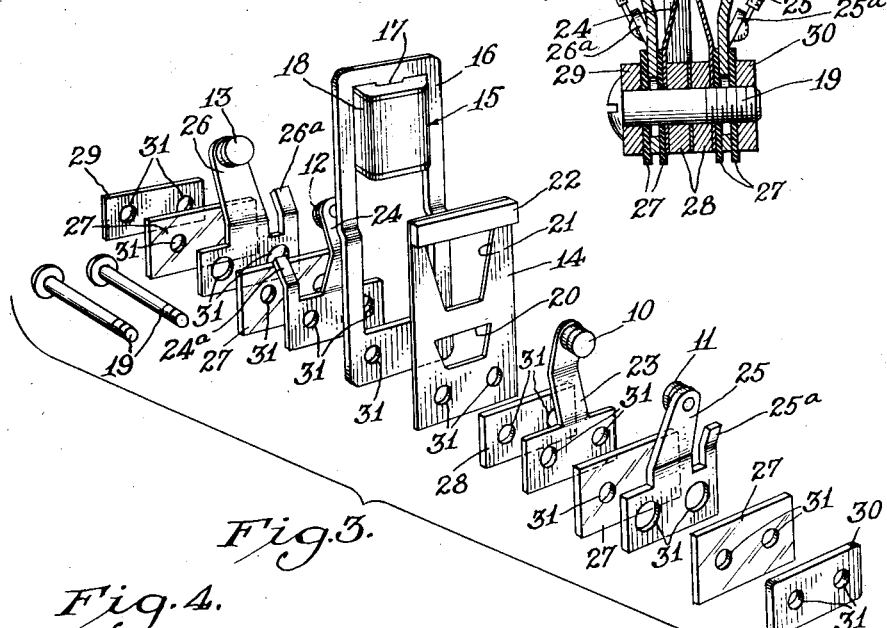
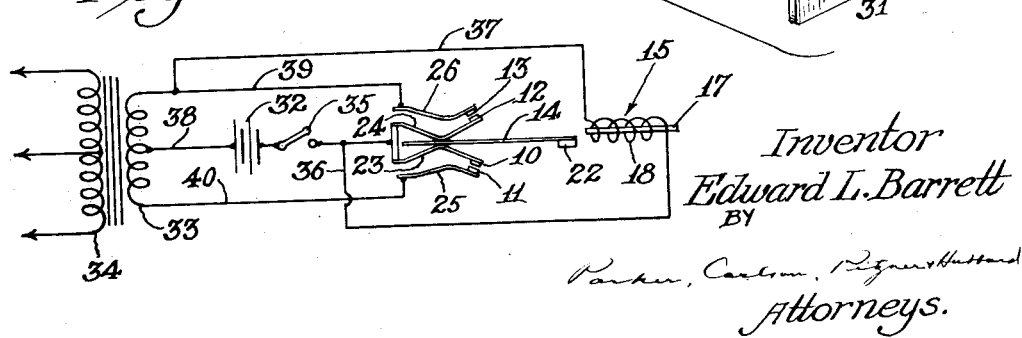
Inventor
Edward L. Barrett
BY
Parker, Carlson, Pigner & Hubbard
Attorneys.

Patented Apr. 14, 1942

2,280,023

UNITED STATES PATENT OFFICE 2,280,023

VIBRATOR

Edward L. Barrett, La Grange, Ill., assignor to Utah Radio Products Company, Chicago, Ill., a corporation of Illinois Application July 1, 1939, Serial No. 282,469

3 Claims. (Cl. 200—90)

The invention relates to vibrators such as are used, for example, in B battery eliminator units for automobile radio receivers.

In a B battery eliminator unit the function of the vibrator is to interrupt at a substantially fixed frequency the current supplied to a step-up transformer from a low voltage source of direct current such, for example, as the conventional storage battery in an automobile. The resultant impulses of direct current excite the transformer primary winding so that a high voltage alternating current is derived from the transformer secondary. This alternating current is, in turn, rectified by some suitable means such as a vacuum tube rectifier or an additional set of rectifying contacts in the vibrator itself. Vibrators with such rectifying contacts are commonly known in the art as "synchronous" vibrators while those which serve only to interrupt the transformer primary current are known as "non-synchronous" vibrators. The present invention is applicable to either synchronous or non-synchronous vibrators.

The general object of the present invention is to provide a vibrator embodying a novel combination and arrangement of parts of such character that the vibrator has a minimum over-all height, is cheap to manufacture and assemble, has a high current carrying capacity, can be readily fashioned to operate at a predetermined frequency within a wide range of selection, is efficient in operation, and produces a minimum of mechanical noise.

In analyzing the means by which the foregoing objects are accomplished, reference may be made, by way of contrast, with the prior vibrator shown in Fig. 1 of Barrett and Manahan Patent 2,072,578, issued March 2, 1937. The vibrator shown in this patent includes a pair of contact supporting fingers 36 riveted to an intermediate portion of a vibratory reed 18. The vibration of the reed serves to swing the contact points on these fingers 36 into and out of engagement with cooperating stationary contact points carried by outer fingers 41. This construction is typical of prior arrangements in that what may be termed the inner pair of contact fingers are fixed to the reed itself. Such an arrangement has the disadvantage that substantially no flexure can take place in the portion of the reed which is clamped between the butt ends of the fingers 36. Consequently, this length of the reed is substantially wasted. In accordance with one aspect of the present invention the inner contact fingers are mounted independently of the reed so that no contact structure of any kind is fixed directly to the body of the reed itself. Consequently, the full length of the reed is free to flex and as a result the over-all length of the reed can be substantially diminished. By the same token, the over-all height of the vibrator is substantially decreased. Furthermore, the assembly of the device is materially simplified and it is easier to predetermine the frequency characteristics of the reed.

Another difficulty is, however, introduced by mounting the inner contact fingers independently of the reed. In particular, when the reed flexes and pushes the fingers laterally into closed position and then swings back to release them there is a strong tendency for the contact fingers themselves to vibrate as reeds. Such secondary or sympathetic vibration of the contact fingers is very objectionable for a number of reasons. Among these are the increase in arcing and migration of metal at the contact points, interference with uniform vibration of the reed itself, and an increase in mechanical noise.

Accordingly, a further object of the invention is to provide in a vibrator of the type described, in combination with an inner contact finger mounted independently of the reed but positioned to be flexed by it, means for damping out secondary vibrations in the contact fingers. In the preferred construction herein disclosed this is accomplished by providing a projection on the contact finger which is in constant rubbing frictional engagement with the reed, thereby serving to damp out any secondary vibrations set up in the contact fingers.

Further objects and advantages of the invention will become apparent as the following description proceeds, taken in connection with the accompanying drawing in which:

Figure 1 is a general perspective view of a vibrator embodying the invention.

Fig. 2 is an exploded perspective view of the vibrator of Fig. 1.

Fig. 3 is an enlarged vertical sectional view along the line 3—3 in Fig. 1.

Fig. 4 is a wiring diagram of the connections for the vibrator of Fig. 1.

For purposes of exemplification the invention has been shown herein as embodied in a vibrator particularly suited to meet the exigencies of use in an automobile radio installation. It will be apparent to those skilled in the art, however, that various changes in construction may be made to meet the requirements of particular uses, etc., without departing from the invention. Accordingly, even though one particular embodiment of the invention has been shown and described in some detail, there is no intention to thereby limit the invention to such embodiment, but, on the other hand, the appended claims are intended to cover all modifications and alternative constructions falling within the spirit and scope of the invention.

The illustrative vibrator (Fig. 1) embodies two pairs of main circuit controlling make and break contacts 10—11 and 12—13. Both of these sets of contacts are open when the device is idle. During operation the pairs of contacts are alternately closed and opened by a substantially freely vibratory reed 14 which is driven by an actuating electromagnet designated generally by the numeral 15.

The various parts of the vibrator are assembled on a frame 16 of the same general type disclosed in said Barrett et al. Patent 2,072,578 referred to above. This frame 16 is of flat and generally rectangular form being preferably fashioned as a stamping from cold rolled sheet steel. On its upper end is formed a longitudinally projecting integral pole piece 17 (see Fig. 2) for the electromagnet 15. An energizing coil 18 for the electromagnet encircles this pole piece. To the lower or butt end of the frame 16 is secured the reed 14 and the other parts of the so-called "stack" of the vibrator by a pair of screws 19 (Fig. 3) as will hereinafter appear in greater detail.

The reed 14 is of cantilever form being fashioned as a stamping from a piece of thin and resilient sheet metal stock. It has been found that a reed of the general form shown may advantageously be made from clock spring steel of 0.006 inch in thickness. The lower portion of the reed is apertured at 20 (Fig. 3) and the upper portion at 21, both of the apertures being of a keystone shape with the larger ends of the apertures facing toward the free end of the reed. These apertures are provided in order to control the flexing characteristics of the reed so that it will flex substantially uniformly throughout its length. To the free end of the reed is spot welded or otherwise rigidly secured a generally rectangular armature 22 made of steel or other metal having a high magnetic permeability. It is arranged to swing past the opposed end of the electromagnet pole piece 17. Consequently, when the electromagnet 15 is energized the armature 22 is attracted and the reed 14 flexed to the left (as view in Fig. 2) and upon deenergization of the magnet the reed flexes in the opposite direction. As will hereinafter appear, the energizing circuit for the electromagnet 15 is controlled by the reed 14 so that the electromagnet serves in general to maintain the reed vibrating at a substantially fixed frequency determined largely by the inherent natural frequency characteristics of the reed itself.

The inner contact points 10 and 12 are fixed respectively to the outer ends of contact fingers 23 and 24 (Fig. 3) of inverted T-shape. Similarly, the outer contact points 11 and 13 are fixed to contact fingers 25 and 26 which are also of inverted T-shape. All of the contact fingers are made of resilient sheet metal such, for example, as phosphor bronze. The contact points themselves may be made of tungsten or other suitable contact material. Integral lugs 24ª, 25ª and 26ª on the respective contact finger bases serve as terminals to which suitable leads may be soldered. Laminations of insulating material 27 are placed on opposite sides of the butt ends of the outer contact fingers 25 and 26 and metal spacers 28 separate the lower ends of the inner contact fingers 23 and 24 from the reed 14. To complete the stack of laminated parts, end plates 29 and 30 are provided.

All of the stack of lamination parts including the frame 16 and reed 14 are fashioned with registering apertures 31 through which the screws 19 are inserted to hold them together as a unitary structure. The holes 31 in the outer end plate 30 are tapped to receive the screws and the holes in the contact fingers 25 and 26 are enlarged so that there will be no metal to metal contact between these contact fingers and the screws.

By mounting the inner contact fingers 23 and 24 in the stack on the frame 16 rather than fixing them to the reed 14 the latter is left entirely free for flexure throughout its length. In this way the length of the reed and, hence, the over-all height of the vibrator can be substantially reduced without impairing the time efficiency of the vibrator. It will be understood that time efficiency is a measure of the proportion of time during which the contacts are closed to that during which they are open. The contact points should be closed during as large a proportion of the time as possible in order to obtain a high time efficiency and for that purpose the free end of the reed must swing through a comparatively large arc after the contact points have closed. Consequently, a high degree of flexibility of the reed is necessary. On the other hand, the reed must be made of sufficiently stiff material so that there will be no inadvertent closure of the contact points when the device is mounted horizontally or moved about in different angular positions as is the case when it is used in an automobile. Various other advantages are obtained by mounting the inner contact fingers 23 and 24 on the frame rather than on the reed. For one, the frequency characteristics of the reed can be much more readily predetermined since its structure, and, hence, flexing characteristics are not complicated by a dead or inflexible mid-portion as is the case when contact fingers are riveted to it. Second, all of the current flowing through the contact points is carried directly to the external terminals through only the contact fingers themselves which have a high electrical conductivity. Since the reed is made of steel its conductivity is much lower and if the inner contact points are mounted on the reed it interposes a substantial resistance on the circuit. The interposition of such a resistance is thus obviated in the present construction. Third, the vibrator is easier and cheaper to assemble since the step of riveting the contact fingers to the reed is eliminated.

In order to minimize secondary or sympathetic vibration in the contact fingers 23 and 24, these fingers are provided with projections arranged in rubbing frictional contact with the reed 14. It will be appreciated that since the fingers 23 and 24 are individually mounted in cantilever fashion in the stack there is a strong tendency for them to vibrate as reeds themselves when they are struck or flexed by the reed 14. Any such secondary vibration of the contact fingers 23 and 24 would be very harmful to the device, however, since it not only tends to cause arcing and migration of metal at the contact points, but also interferes with the vibration of the reed 14 and tends to change its period or frequency of vibration. In the illustrative construction any such tendency toward secondary vibration in the contact fingers 23 and 24 is overcome by permanently bending them transversely in what may be termed a flattened V form (see Fig. 2) so that their projecting portions 23ª and 24ª are so that their projecting contact with the portion of the reed 14 between the apertures 20 and 21. The contact fingers are resiliently urged inward into contact with the reed 14 and remain in contact with it at all times. The friction between these rubbing parts effectually damps out any force tending to set up secondary vibrations in the contact fingers. The outer contact fingers 25 and 26 are bent outwardly so that the faces of the contact points 11 and 13 carried by them are in exactly parallel relation with the opposed faces of the inner contact points 10 and 12.

In use the vibrator described may be connected in circuit like that of Fig. 4. In general the vibrator serves to connect a storage battery 32 alternately across the two half sections of a transformer primary winding 33. The impulses of direct current thus caused to flow through the winding 33 induce a high voltage alternating current in the transformer winding 34. This high secondary voltage may, in turn, be rectified and fed to the plate circuits of a radio set or the like. To initiate operation of the device, a starting switch 35 is closed, thereby energizing the vibrator electromagnet winding 18 (through a circuit 32—35—36—18—37—33—38—32). Energization of this electromagnet attracts the armature 22 pulling it upward (as viewed in Fig. 4) and the resultant flexure of the reed 14 pushes the contact 12 outward into closed relation with the cooperating contact 13. Closure of these contact points 12—13 connects the battery 32 across the upper half of the transformer primary winding 33 (through a circuit 32—35—12—13—39—33—38—32) and this circuit at the same time shunts the electromagnet winding 18, the resistance of the transformer primary winding being much lower than that of the electromagnet winding. The resultant deenergization of the electromagnet permits the reed 14 to swing back toward its central position and the energy stored up in the resilient reed carries it on past its mid-position so that it not only permits the contacts 12—13 to reopen but closes the other pair of contacts 10—11. Closure of this latter pair of contacts connects the other or lower half of the transformer primary winding 35 across the battery 32 (through a circuit 32—35—10—11—40—33—38—32). As soon, however, as the contacts 12—13 are reopened the energizing circuit for the electromagnet winding 18 is restored. Consequently, the cycle of operation described is repeated and continued at a high rate of speed, the rate of contact closure being determined primarily by the resilient characteristics of the reed 14.

The vibrator herein illustrated is characterized by an extreme constancy of frequency even with changes in potential of the battery 32. This is a matter of prime importance in a vibrator intended for use in a B battery eliminator circuit of an automobile radio since the storage battery of an automobile is subject to wide fluctuations in voltage. For example, even though the conventional automobile storage battery is rated at 6 volts the actual voltage obtained is likely to vary between 3 and 9 volts. On the other hand, the constants of the circuit or network to which the vibrator is connected are tuned to a predetermined frequency and if the vibrator contacts are not opened and closed at this predetermined frequency destructive arcing at the contacts will result. By providing a vibrator in which the frequency of contact actuation is maintained substantially constant even with wide fluctuations in battery voltage such arcing is minimized.

The vibrator herein disclosed is also advantageous in that a wide choice of reed frequencies is obtainable. Heretofore, it has been the practice to build vibrators for automobile radio B battery eliminators to have a reed frequency of the order of magnitude of 115 cycles per second. In such installations it is desirable, however, to have a somewhat higher frequency in view of the fact that the size of the transformer can be substantially cut in half by doubling the frequency. With the present vibrator construction it has been found that a reed frequency of approximately 210 cycles per second can be obtained with a reed fashioned of the materials described above and with the contact fingers made of phosphor bronze of 0.010 inch in thickness. That this is a remarkably high frequency for such a vibrator will be appreciated when it is borne in mind that the vibrator of the Barrett et al. patent mentioned above has a frequency of only about 115 cycles per second even when the reed is made of clock spring steel of 0.0077 inch in thickness.

I claim as my invention:

1. A vibrator comprising, in combination, a supporting frame, a resilient vibratory reed fashioned in the form of a flat strip of thin metal and fixed at one end to said frame to project therefrom in cantilever form for vibration of the projecting free portion of the reed, means including an electromagnet for starting and maintaining said reed in vibration at a frequency determined generally by the inherent natural frequency of the reed, a resilient contact finger lying along one side of said reed in position to be flexed laterally by the reed during vibration of the latter, means for supporting said finger on said frame independently of said reed so as to leave the latter free for flexure throughout its length without obstruction from any contact structure secured to it, a first contact point fixed on the outer side of said finger, means for supporting a second cooperating contact point in opposed and normally spaced relation to the first contact point in position to be contacted by the latter upon lateral flexure of said finger, and said finger being bent laterally to position a portion thereof in rubbing frictional contact with said reed during the latter's vibration for damping out secondary vibrations in said finger.

2. A vibrator comprising, in combination, a support, a resilient vibratory reed fashioned in the form of a flat strip of thin metal fixed at one end to said support to project therefrom in cantilever form for vibration of the projecting free portion of the reed, means including an electromagnet for vibrating said reed, two pairs of resilient sheet metal contact fingers arranged with one pair on each side of the reed and projecting along the same, means for supporting said fingers on said support independently of the reed to leave the latter free for flexure throughout its length, and the inner finger of each pair being bent inwardly intermediate of its ends into rubbing frictional engagement with the adjacent face of the reed.

3. A vibrator comprising, in combination, a support, a resilient vibratory reed fashioned in the form of a flat strip of thin metal fixed at one end to said support to project therefrom in cantilever form for vibration of the projecting free portion of the reed, said reed having at least two apertures therein spaced from each other longitudinally of the reed, two pairs of resilient sheet metal contact fingers arranged with one pair on each side of the reed and projecting along the same, means for supporting said fingers on said support independently of the reed to leave the latter free for flexure throughout its length, and the inner finger of each pair being bent inwardly into rubbing frictional engagement with the adjacent face of the reed intermediate said apertures in the latter.

EDWARD L. BARRETT.